(12) United States Patent
Anand (10) Patent No.: US 7,033,182 B1
(45) Date of Patent: Apr. 25, 2006

(54) METHOD OF DEVELOPING EDUCATIONAL MATERIALS BASED ON MULTIPLE-CHOICE QUESTIONS

(75) Inventor: Indu Mati Anand, Chelmsford, MA (US)

(73) Assignee: Indu M. Anand, Chelmsford, MA (US)

( * ) Notice: Subject to any disclaimer, the term of this patent is extended or adjusted under 35 U.S.C. 154(b) by 553 days.

(21) Appl. No.: 09/951,132

(22) Filed: Sep. 12, 2001

Related U.S. Application Data (60) Provisional application No. 60/232,110, filed on Sep. 11, 2000.

(51) Int. Cl.
*G09B 7/00* (2006.01)
*G09B 19/00* (2006.01)

(52) U.S. Cl. .................. 434/322; 434/118; 434/362

(58) Field of Classification Search ......... 434/319–364
See application file for complete search history.

(56) References Cited

U.S. PATENT DOCUMENTS

| | | | |
|---|---|---|---|
| 5,784,564 A * | 7/1998 | Camaisa et al. ............ 709/224 |
| 5,999,797 A * | 12/1999 | Zancho et al. ............. 455/12.1 |
| 6,077,085 A * | 6/2000 | Parry et al. ................. 434/322 |
| 6,216,111 B1 * | 4/2001 | Walker et al. ................ 705/14 |

* cited by examiner

*Primary Examiner*—Anthony Knight
*Assistant Examiner*—Michael B. Holmes
(74) *Attorney, Agent, or Firm*—Wolf, Greenfield & Sacks, P.C.

(57) ABSTRACT

The present invention comprises a method of developing educational products or materials by utilizing multiple-choice questions. Starting with a given set of facts to be presumed in a question, the method may require one to examine each answer choice, and inquire how a set of facts to be presumed could be modified to make that answer choice the "correct" or "best" answer choice. If a given answer choice is already correct, no modification is needed. If a given answer choice is not correct, various modifications may be employed, including changing some of the words or phrases, or other symbols or objects within the set of facts to be presumed.

38 Claims, 3 Drawing Sheets

METHOD OF DEVELOPING EDUCATIONAL MATERIALS BASED ON MULTIPLE-CHOICE QUESTIONS

CROSS REFERENCE TO RELATED APPLICATIONS

This application claims the benefit of prior-filed provisional application No. 60/232,110, filed Sep. 11, 2000 and entitled A Method of Developing Educational Materials Based on Multiple-Choice Questions, which is incorporated herein by reference.

FIELD OF THE INVENTION

The present invention relates generally to multiple-choice questions, and more specifically to a method of generating educational materials based on multiple-choice questions.

BACKGROUND OF THE INVENTION

Multiple-choice questions are a common way of testing students in a variety of subject areas. In most cases, a multiple-choice question comprises three identifiable sections: a section containing a set of facts to be presumed (for instance, a narrative, a short story, a poem, an expression, an equation, or a geometric figure), an interrogative sentence (sometimes known as the "call of the question"), and a set of answer choices.

A multiple-choice question may conveniently be divided into two parts—a first part, comprising a set of facts to be presumed and an interrogative sentence, and a second part, comprising a set of answer choices. The first part may also be termed a "query." (The term "query" can alternatively refer to the interrogative sentence alone, but as used herein, the term "query" refers to the entire first part of the question (i.e., both the set of facts to be presumed and the interrogative sentence), unless otherwise noted. In the second part, between three and five answer choices are typically presented, although the number of answer choices may vary below three or above five under appropriate circumstances. (For instance, in a so-called "true/false question," there are typically two answers: "true" and "false.")

The set of facts to be presumed may be expressed using words or phrases, or a set of objects or symbols, or a combination of words, objects and symbols. Alternatively, the set of facts to be presumed may be expressed in any other appropriate way, such as with a figure, a picture, or another graphical representation. (For instance, in an art history exam, the set of facts to be presumed may constitute a piece of art or a picture thereof.) The interrogative sentence typically asks the student or examinee to pick the "correct," or the "best," answer, and to indicate the selected answer choice either on the exam paper, for instance, by circling the selected answer choice, or on a separate answer sheet. The separate answer sheet may include a small shape, such as a small circle, oval or rectangle, corresponding to each answer choice of each question, which shape may be filled in by the examinee, for instance with a pencil. Typically, the examinee is asked to fill in the shape corresponding to the selected answer, while leaving blank the shapes corresponding to the question's other answer choices. Other answer sheets may have any other appropriate configuration now known or later developed. In most cases, the examinee may leave a question unanswered, but may not select more than one answer choice per question. Thus, a multiple-choice question generally has no more than one valid answer. In other cases, where multiple valid answers exist, various answers may yield either full credit or varying amounts of partial credit, and methods disclosed herein may be extended in a recursive, analogous manner.

Indication of answers on a separate answer sheet is popular, being suitable for automatic or machine grading of the answer sheets; the automatic or machine grader compares a given answer sheet with the template of "correct" answers and counts the number of questions where the filled-in shapes (for instance) match the template. The examinee's score, also sometimes called the "grade," may then be computed based on a formula that may depend on the number of questions answered correctly versus the number of questions answered incorrectly. Undoubtedly, the low cost, high speed, convenience and uniformity with which multiple-choice tests can be graded contribute to their popularity.

Implicit in the typical scoring formulas for multiple-choice tests is an assumption that examinees with a mastery of the subject matter will work efficiently to select the correct answers, whereas those who depend largely on guesswork will not do much better than the statistical odds of hitting the correct answers at random. However, in practice, the distinctions between the examinees' scores are rarely as clear-cut, due to quirks of the multiple-choice format. Specifically, an examinee unfamiliar with the tested material can beat the statistical obstacles to a high score by relying, at least in part, on guesswork—if the examinee is able to eliminate one or more incorrect answer choices and "guess" from a smaller pool of possible answers. On the other hand, an examinee who understands the tested material well may inadvertently choose an incorrect answer, despite that understanding, because of a minor error in analysis or computation. Such an error, no matter how minor, will lead to a complete loss of credit for the question, if it results in selection of an incorrect answer choice. In short, the typical multiple-choice testing format provides little room for demonstrating the soundness of the underlying analysis or the accuracy of computation except in the final answer.

In a common scenario, total loss of credit may result from, for example, an incorrect answer choice being selected in lieu of the correct answer choice, based on the distinction of a single word, phrase, value or fact in the question (even though the examinee understood the question). For example, if a multiple-choice question asks an examinee to calculate the volume of a box having sides of 1 foot, 2 feet and 3 feet, the correct answer is the product of the three lengths, or 6 cubic feet. An examinee who understands the question may inadvertently choose the incorrect answer "9 cubic feet" if he or she misreads the "2" as a "3." Thus, the very ease and simplicity of selecting and recording an answer to a multiple-choice question may obscure the difference between knowledge and ignorance on the examination.

This quirk of the multiple-choice format leads to a gap between classroom teaching, at nearly all levels of instruction and in all subject disciplines, on the one hand, and multiple-choice examinations, on the other hand. Teaching in a manner calculated to prepare students for a multiple-choice exam ("teaching to the test") requires devoting class time to test-taking "tricks," reducing the time available for actual teaching of the subject matter. In addition, focusing on "tricks" diverts attention from the aforementioned problem with multiple-choice exams, which cannot be solved with such conventional tricks, but requires instead a teaching method that instills in students the discipline to carefully analyze the most important facts or decision-points within a question.

Despite the aforementioned difficulties, the multiple-choice testing format is widely used, particularly for national and standardized tests. The popularity of multiple-choice testing has given rise to a need for educational products that provide students with substantive test-taking preparation. At present, substantial publishing resources are devoted exclusively to preparing students to take various multiple-choice examinations. These resources typically rely on various permutations and combinations of the following paradigms: state important subject matter concepts; emphasize and reinforce key concepts; present a number of multiple-choice questions with answers, either with or without explanations of why the answer choices are right or wrong; append simulated examinations; and, present a collection of general strategies, tips and tricks for answering multiple-choice questions.

Such materials primarily seek to familiarize students with the multiple-choice format in general and the types of questions in the subject or discipline which can be asked in such a format, and in varying degrees, to reinforce the subject matter concepts.

In terms of practical guidance for answering each question, the currently available materials offer three models: provide the correct answer without explanation; provide the correct answer with an explanation of why it is correct; or, provide the correct answer with explanations for each answer choice to show why it is correct or incorrect.

However, the currently available materials, even those providing explanations for each answer choice, leave a gap in teaching the art of closely reading the fact pattern of a question, critically evaluating the answer choices, and learning to recognize the critical pieces of information in the fact pattern on which these answer choices turn. For this reason, these materials are not designed to exploit the unique strength of the multiple-choice format as a powerful device to learn and absorb any subject matter.

SUMMARY OF THE INVENTION

Some or all embodiments of the present invention may address and/or eliminate the above and other drawbacks.

The present invention may provide an improved method for exploiting the multiple-choice format by focusing students on the art of closely reading the fact pattern of a question, critically evaluating the answer choices, and learning to recognize the critical pieces of information in the fact pattern on which the answer choices turn.

One or more embodiments of the present invention may be called a "Reverse Multiple-Choice Method," or RMCM.

RMCM is a method of developing educational products or materials by utilizing multiple-choice questions. As its name implies, RMCM represents a reversal of perspective from the ordinary multiple-choice approach. Starting with a given set of facts to be presumed, the method may require one to examine each answer choice, and inquire how the set of facts to be presumed could be modified to make that answer choice the "correct" or "best" answer choice. If a given answer choice is already correct, no modification is needed. If a given answer choice is not correct, various modifications may be employed, including changing some of the words or phrases, or other symbols or objects within the set of facts to be presumed.

Whereas currently available educational products based on the multiple-choice format regard the set of facts to be presumed as "fixed," and "variably" examine the answer choices to pick the correct one, RMCM temporarily "fixes" an answer choice as the correct answer and "varies" the facts of the question to accommodate that assumption.

In one embodiment, a minimum number of words or phrases, or other symbols or objects within the set of facts to be presumed are changed, so as to make the selected answer choice the correct answer for the modified question.

In some embodiments, multiple-choice questions will be provided, with modified questions provided to which the answer choices that are "incorrect" with respect to the original question are "correct." The differences between original questions and modified questions may be highlighted for emphasis. Original and modified questions may also be shown side-by-side. In other embodiments, the student may be prompted (for instance, by a teacher, or by a computer program) to generate a modified question to which a previously incorrect answer is a correct answer. Yet further embodiments are described below.

Educational products or materials based on RMCM may be generated from a set of multiple-choice questions, for purposes of review, tutorial workshop, self-study, or preparation for an examination.

RMCM media are not limited. Various embodiments of the present invention may be implemented in conjunction with any known or later-developed educational media, including books and other printed materials, audiographic media such as audio tapes, CDs, MP3s or the like, videographic media such as video tapes, DVDs, or any other media, with or without interactive capability. In some cases, periodic updates of additional questions and RMCM products may be provided, including by computer, e-mail or the internet. Any known or later-developed media suitable for educational purposes may be employed.

RMCM turns the structure of the multiple-choice format into a unique strength by presenting information in groups of manageable morsels. By teaching a student to deconstruct and reassemble a question, RMCM trains him or her to critically examine a given set of facts, and to recognize the key words, phrases or facts. In the process, RMCM assists the student to achieve in-depth learning of particular subject matter. This training, and the associated in-depth learning, can be useful to the students for taking multiple-choice, or other types of, examinations, as well as in career situations calling for a good grasp of particular subject matter. In short, RMCM need not be used exclusively for test preparation, but may be a useful tool in many other areas and for many other purposes as well.

Materials based on RMCM may be used by classroom teachers for review or tutorial sessions, or to augment classroom or textbook teaching. Furthermore, the RMCM methodology can lead to a framework for the development of objective techniques for writers and designers of examinations to evaluate the suitability of the test questions for the examinations.

One illustrative embodiment of the present invention comprises a method of generating educational materials, comprising the steps of (a) providing one or more multiple-choice questions, each question comprising a query and a plurality of answer choices, wherein said plurality of answer choices comprises one correct answer and one or more incorrect answers; and (b) for at least one of said one or more incorrect answers, providing a follow-up query to which said incorrect answer is a correct answer.

Another illustrative embodiment of the present invention comprises a method of generating educational materials, comprising the steps of (a) providing one or more multiple-choice questions, each question comprising a query and a plurality of answer choices, wherein said plurality of answer choices comprises one correct answer and one or more incorrect answers; (b) identifying one or more fact objects in said query; (c) modifying said query by changing one or more of said one or more fact objects to produce a follow-up query; (d) determining whether said incorrect answer is a correct answer to said follow-up query; and (e) if said incorrect answer is not a correct answer to said follow-up query, repeating steps (b), (c) and (d).

DETAILED DESCRIPTION

The Reverse Multiple-Choice Method of the present invention is a novel paradigm for utilizing the multiple-choice question format to access, analyze, present and absorb the information embodied in the question and the accompanying answer choices. The present invention also comprises the production of related educational materials or products, with or without interactive capability, as described above.

As noted above, it may be convenient to divide a multiple-choice question into two parts. The first part comprises a set of facts to be presumed and an interrogative sentence. The first part may also be termed a "query." As used herein, the terms "first part," "First_Part" and "query" shall be synonymous, unless otherwise noted. A second part of a question comprises a set of answer choices. As used herein, "second part" and "Second_Part" shall be synonymous, unless otherwise noted. (In addition to the definition above, it may be convenient to think of the first part of a question as comprising the portion of a question not included in its second part.)

A correct answer (or "Correct_Answer") is the answer choice that will or would be graded on a test as the "correct" or "best" answer choice to a given query.

A first part of a question typically comprises one or more fact objects (or "Fact_Objects"). A fact object is defined to include any object, word, element, number, operator symbol, phrase, or a group of words, elements, numbers, operators, symbols, or other objects, or any other type of entity capable of holding information. A fact object typically denotes a fact, datum or piece of information in the first part of a multiple-choice question that may be considered when interpreting the answer choices or choosing an answer choice to the question. For instance, in the example discussed above of the box having sides of 1 foot, 2 feet and 3 feet, the length of each side may be considered a fact object. In a short story, each piece of information presented (which can be thought of as a group of words) may be considered a fact object. In a question on an art history exam, there may be a single fact object—the piece of artwork presented—and the interrogative sentence may ask the examinee to consider answer choices relating to the work or its creator to select the "correct" answer choice.

In one embodiment, where a fact object is a phrase or a group of words elements, numbers, operators, symbols, or other objects or entities, the whole of such phrase or group—but no part less than the whole—of such phrase or group, denotes the particular fact, datum or piece of information contained in or conveyed by the fact object. The significance of a fact object may derive partly or primarily from the context of (including its placement within) the query and the set of answer choices of a particular multiple-choice question.

In one embodiment of the present invention, a user is required to examine a query in view of the associated answer choices, and to modify the query such that an incorrect answer choice becomes a correct answer choice of the modified query (the "Reverse Multiple-Choice Variation Criterion"). In another embodiment, one or more modified queries may be presented to a user through educational materials such as a book, or on a computer screen. In yet a further embodiment, a teacher may present such modified queries to a student orally or on a blackboard.

In a preferred embodiment, the variation criterion used is the Reverse Multiple-Choice Minimality Criterion: for each answer choice, the modification of the query is required to involve the minimum number of changes to fact objects such that the answer choice will become the correct answer to the modified question. In other embodiments, this criterion need not be employed, and the number of changes to fact objects may be any desired number.

The introduction of additional language may be useful for understanding certain embodiments. A modified query for which a particular answer choice is the correct answer may be called a query_variant (or "query variant") for the answer choice. If a particular answer choice is the correct answer to the unmodified query, then no change in the fact objects of the query will be needed; otherwise, one or more possible modifications of the query will generally exist, and each query so modified may be selected as a query variant for the answer choice. The set of all possible query variants corresponding to an answer choice will form the query variant_set (or "variant set") corresponding to the answer choice. This set may be finite, or it may be infinite. The set of query variants corresponding to an answer choice will be the empty, or null set if, and only if, no modification of the query exists that will make a particular answer choice the correct answer.

In some cases, changing one fact object may be sufficient to produce a query variant, while in other cases many fact objects (possibly even every fact object) may have to be changed.

It is possible for two query variants to be isomorphic in the sense that one query variant differs from the other query variant only by trivial differences of fact objects. Presentation of more than one isomorphic query variant may not be useful in most embodiments of the invention.

A reference to a "complete" set of variants corresponding to an answer choice signifies that every possible query variant for the answer choice is identified. A "partial" set of query variants is a proper subset of the "complete" set of query variants for the answer choice.

The RMCM answer to a multiple-choice question is defined as the aggregation of sets of query variants for all the answer choices of the question. An educational material or product based on RMCM may constitute a compilation of such answers to a collection of multiple-choice questions, or may constitute a smaller subset of such data.

In particular, it is not necessary that the complete set of query variants be identified for each incorrect answer choice, or that the complete RMCM answer be provided for each question. In practical applications, it may often suffice to identify a "partial" set of query variants for each answer choice, providing only the most illuminating query variants. However, in some cases, the instructive value of an answer may improve as the included sets of query variants near completeness; also, the educational value of an RMCM product may increase with the number of nearly complete answers given in it.

One illustrative embodiment of the present invention will now be described with reference to the appended figures.

Figure 1:
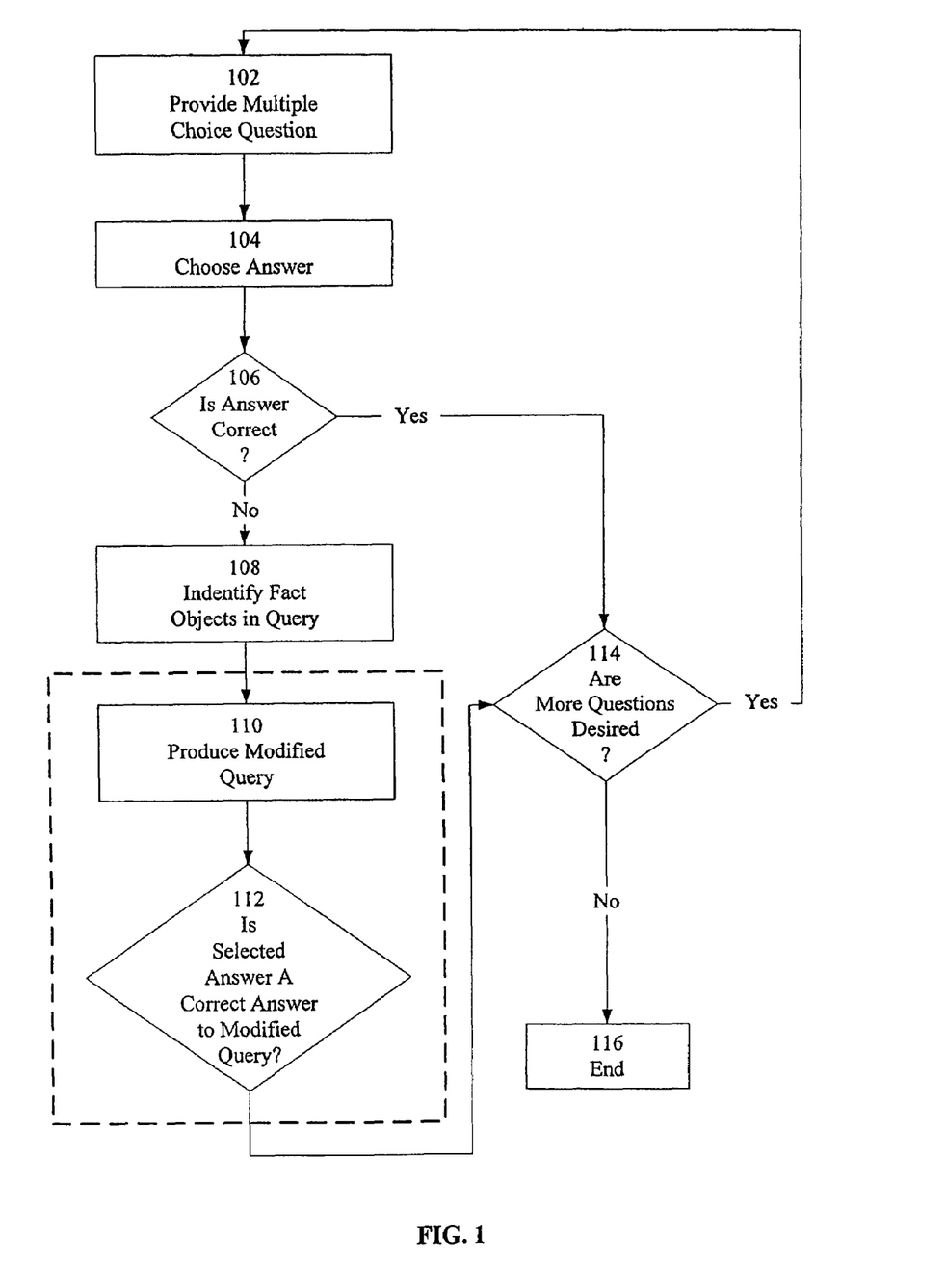
FIG. 1 is a high-level flow chart showing one embodiment of a method of the present invention.

As shown in FIG. 1, at step 102 a multiple-choice question may be provided. In one embodiment, the question may be provided orally or in writing by a teacher or a tutor. In another embodiment, the question may be provided by a computer or over a telecommunications network such as the internet. In yet other embodiments, the question may be provided in any medium suitable for educational purposes, including a book. A multiple-choice question provided for purposes of the present invention may be a conventional multiple-choice question, available through existing sources. Alternatively, it may be written with the present invention in mind. The present invention may pertain or relate to any type of multiple-choice question, regardless of medium or subject matter, and regardless of whether the question now exists or is later developed.

As noted above, the multiple-choice question provided generally comprises a query and a set of answer choices. In step 104, an answer choice is selected. Selection of an answer choice may, in some embodiments, be carried out via a computer or a communications network such as the internet. Alternatively, selection of an answer choice may be oral or may be accomplished by any other suitable means of communication now known or later developed. In some cases, a user or student may select an answer. In other cases, such as in a demonstration of the RMCM method, a teacher or a computer may select an answer choice.

If the selected answer choice is correct, another question may be provided, if desired. As shown generally at decision block 114, another question may be provided or may not be provided, depending on a variety of circumstances. For instance, if a book of questions has been completed, another question may not be desired, and the process may proceed to step 116, its end. Alternatively, if a pre-set number of questions have been answered on a computer or interactive embodiment, the process may also proceed to step 116. As one of skill in the art will readily understand, the logic and criteria within decision block 114 may be varied depending on the circumstances of a particular application.

In other embodiments, decision block 106 may not be present, and the process may continue directly to step 108 even if the selected answer choice is correct, without determining whether an additional question is desired. In particular, in some embodiments, it is desirable to apply the portion of the RMCM method represented by steps 108, 110 and 112 to a question, regardless of whether the first answer choice selected is the correct answer. This may be accomplished by presenting certain information, described in more detail below, in a book or on a computer screen, or it may be accomplished by an oral discussion of the information, or through any other appropriate, known or later-developed means.

At step 108, a user may be prompted to identify fact objects in the query. Alternatively, the fact objects may be identified in one embodiment by a computer program or in another embodiment by highlighting or bolding in a book. Any other appropriate means of identifying the fact objects may also be employed. In some embodiments, the fact objects need not necessarily be identified explicitly, and step 108 may be removed.

Next, at step 110, a modified query is produced. In one embodiment, a student or a user may produce the modified query, for instance by examining the fact objects in the query in view of the selected answer choice. In another embodiment, modified queries may be pre-stored in computer memory, or may be generated by computer software such as an expert system.

As shown at step 112, if the selected answer choice is a correct answer to the modified query, and another question is desired, another question may be provided. Alternatively, if the selected answer choice is not a correct answer to the modified query, the user will be asked to produce another modified query. In some embodiments, a limited number of such attempts may be permitted before a new question is provided or the process is ended entirely.

In other embodiments, when a selected answer choice is a correct answer to the modified query, steps 104, 106, 108, 110 and 112 may be performed again, for another answer choice. It may sometimes be desirable to produce modified queries to which each of the answer choices provided are correct answers. In other cases, modified queries may be provided corresponding to less than all of the answer choices. As discussed in some detail above, these modified queries may be generated by a student, or may be generated for inclusion in a book or other educational materials provided to the student, or may be provided by a computer program or over the internet. A student may use these modified queries as a study aid, to determine why the differences between the modified queries and the unmodified queries lead to different correct answers.

There are many ways in which one or more fact objects in a query may be changed to produce a modified query. In some cases, the fact objects may be changed by a user or a student, in view of the particular answer choice selected. In other cases, the fact objects may be changed by individuals other than the user or student, to generate modified queries that may be provided to the user or student in the form of educational materials such as a book, as discussed above. In yet other cases the fact objects may be changed in any known or later-developed automated or un-automated fashion by a computer or computer system or network.

Figure 2:
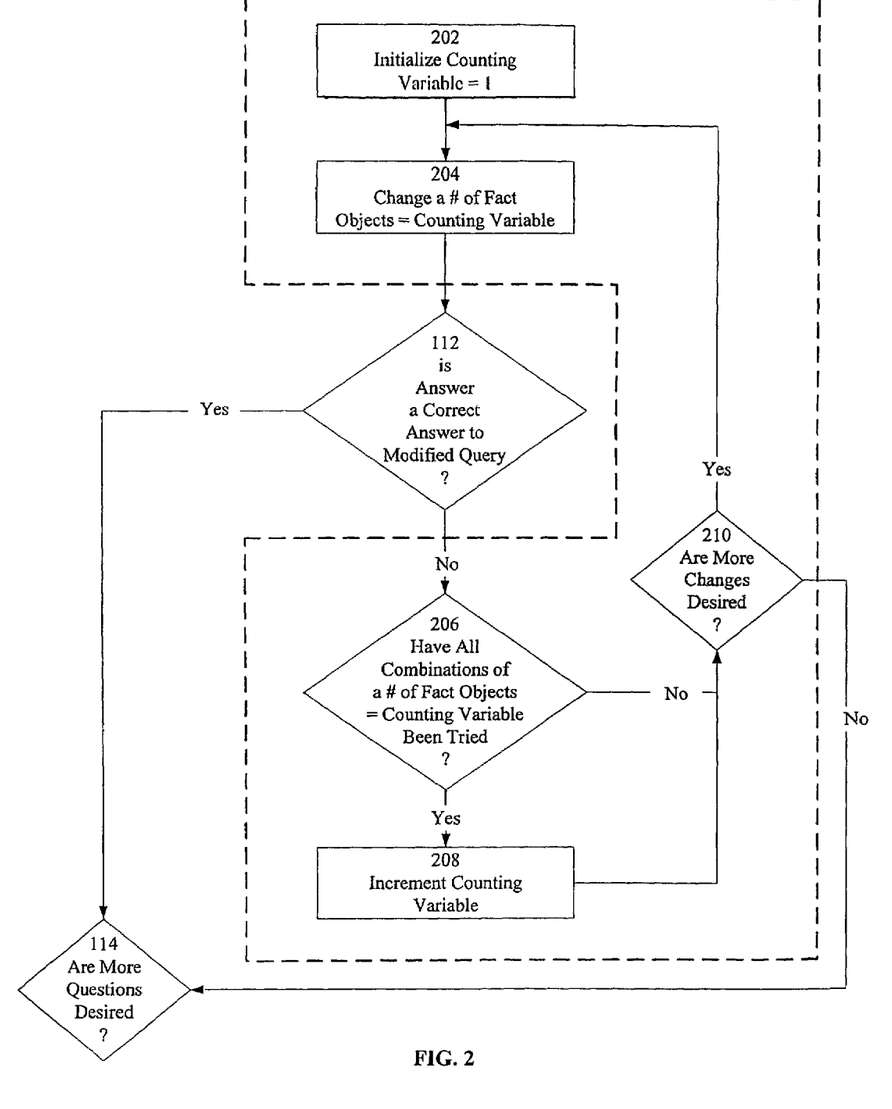
FIG. 2 is a detailed flow chart illustrating functional logic shown at a high level inside the dotted line of FIG. 1.

FIG. 2 is a detailed flow chart showing illustrative functional logic shown at a high level inside the dotted line of FIG. 1. Specifically, FIG. 2 provides one illustrative embodiment of the production of modified queries. As one of skill in the art will readily understand, there are many other ways to produce modified queries that will fall within the scope of the present invention.

At step 202, a counting variable is initialized to a value of 1. Next, at step 204, a number of fact objects in the query are changed to produce a modified query to which a particular answer choice may be a correct answer. In the embodiment illustrated, the number of fact objects changed is equal to the counting variable (initially one fact object). If, after the change, the selected answer is a correct answer to the modified query, more questions may be asked (depending on the outcome of decision block 114; as noted above, decision block 114 may include any appropriate logic or criteria).

Additional events after production of an outcome by decision block 114 are not shown in FIG. 2.

If the answer choice selected is incorrect, additional changes may be effected. In the exemplary embodiment illustrated in FIG. 2, the same number of fact objects will continue to be changed until all combinations of that number of fact objects have been changed. For example, where the counting variable is still 1, another single fact object will be changed, so long as not every fact object has been changed once. Whether this criterion is met is determined at step 206. If all combinations of a given number of fact objects have been tried, the counting variable will be incremented at step 208, and the process will revert to step 204. If not, an additional attempt will be made without incrementing the counting variable.

For example, suppose a query asks the volume of a box having three sides. The length of each side, provided in the first part of the question, is considered a fact object. Suppose further that the second part of the question provides four possible answers, one of which is a correct answer to the query. If the answer choice selected at step 104 in FIG. 1 is incorrect, the functional logic illustrated in FIG. 2 will be implemented, and a single fact object within the query (i.e., the length of one of the sides of the box) will be changed at step 204 in FIG. 2. If this change does not produce a modified query to which the selected answer is a correct answer, the length of another side of the box will be changed. After the lengths of all three sides of the box have been changed seriatim, the outcome of decision block 206 will be "yes," and the counting variable will be incremented. After that, the lengths of two sides of the box will be changed at a time.

It is important to stress that, in other embodiments, various numbers of fact objects may be changed in various orders, and the illustrative structure of FIG. 2 need not necessarily be adhered to. In addition, a single fact object can also be changed more than once in a row. In some cases, only a single fact object may be changed. Yet other embodiments and algorithms are envisioned.

It is also important to note that there are a number of different embodiments in which the present invention may manifest itself. In some embodiments, queries, associated answer choices and modified queries may be provided in a paper format such as in a book. In other embodiments they may be provided in an electronic format such as on a computer. In some cases, the method will be interactive, and in other cases it will consist solely of actions on the part of a single user.

Another way of describing an illustrative process consistent with the present invention follows. Specifically, this illustrative process is a process for identifying the RMCM_Variant_Set for an answer choice of a multiple-choice question through the use of a sequential algorithm:

For an answer choice in Second_Part:
(i) If answer choice is Correct_Answer, stop; answer choice is an RMCM_Variant;
(ii) Replace a Fact_Object in First_part by a corresponding new Fact_Object;
(iii) If answer choice is Correct_Answer for the modified First_Part, then modified First_Part is a RMCM_Variant for the answer choice;
(iv) Select a different Fact_Object in First_Part, and carry out steps (ii) and (iii);
(v) Cycle through all Fact_Objects in First_Part, one at a time, to carry out steps (ii) to (iv);
(vi) If one or more RMCM_Variant found, stop;
(vii) Cycle through all Fact_Objects in First_Part, replaced two at a time by corresponding new Fact_Objects, to modify First_Part and carry out steps similar to (ii) to (vi);
(viii) Cycle through all Fact_Objects in First_Part, three at a time, to modify First_Part and carry out steps (ii) to (vi);
(ix) Replace each Fact_Object in First_Part with a corresponding new Fact_Object;
(x) Modified First_Part is an RMCM_Variant.

All the RMCM_Variants found when the process stops are members of RMCM_Variant_Set for the answer choice.

Because the structure of RMCM rests on identification and replacement of actual words, phrases or objects in queries, the method may offer a structure, basis and/or opportunity for concrete communication between a student and a tutor or teacher. Therefore, RMCM may provide a promising and natural framework for development of interactive tutorial instruction programs, and for in-depth assessment and evaluation of a student's progress. These features may make RMCM particularly suitable for the development of on-line and internet-based tutorial programs.

In using an RMCM Product, the students generally will have an interesting, engaging and incisive learning tool in their hands. RMCM can be considered to use the answer choices of a question as "packets" that allow for segmentation of the "information" contained in the "facts" of the question for absorption and analysis; therefore, an RMCM_Answer may steer the student's attention to a comparison of the nuances which distinguish the answer choices, and the key words, phrases or facts on which those distinctions rest. RMCM may require a student to deconstruct and reassemble a question, which may be a promising training exercise in critically examining a given set of facts. Moreover, these activities of deconstruction and reassembly of a question germane to the RMCM, may be similar in appeal to a game or a puzzle, and may hold the "learning by doing" quality of active as opposed to passive learning; therefore, RMCM_Products may present an engaging method to learn the subject matter in-depth.

In the RMCM_Products, a teacher conducting review or tutorial sessions for a group of students may have at his or her disposal effective teaching materials to simultaneously present the subject matter and a strategy for comprehending the structure of multiple choice test, in a related, integrated and mutually reinforcing manner, without sacrificing either the subject matter teaching or the test-taking strategy. Teachers may also find RMCM_Products useful to supplement the classroom or textbook materials, or for in-depth review for other types of examinations.

The RMCM may also provide a framework to serve as the basis for the development of objective measures of the difficulty of a test question. A typical example of a relatively "easy" multiple-choice question is a question where the RMCM_Variant_Set corresponding to the correct answer consists of RMCM_Variation_Identity and the RMCM_Variant_Sets corresponding to each of the incorrect answers consists of sets of completely different questions. Near the opposite extreme may be a difficult multiple-choice question, for which corresponding to each answer choice all the RMCM_Variants differ from the given question by just one word or symbol. In other words, generally, the greater the number of fact objects that must be changed to produce a modified question to which a selected answer is a correct answer, the harder the question.

Different measures of difficulty of a question between the two extremes may depend on a set of parameters which include the cardinality of each RMCM_Variant_Set and the extent of variation required for each incorrect answer, as well as the number of answer choices for which considerations of cardinality and extent of variation are complex. The development of these detailed measures of difficulty based on the RMCM approach and accepted pedagogic principles of educational and statistical measurement, however, is outside the scope of the present document.

For explanatory purposes, some examples of educational materials consistent with one or more embodiments of the current invention are reproduced below. The questions are taken from the 2001 MCAS Tests for 10th grade, released by the Department of Education, and reported in The Boston Globe on Tuesday, Jun. 19, 2001 (incorporated herein by reference).

Question 1:

Sonnet 116

Let me not to the marriage of true minds
Admit impediments. Love is not love
Which alters when it alteration finds
Or bends with the remover to remove.
O, no! It is an ever-fixed mark
That looks on tempests and is never shaken.
It is the star to every wand'ring bark,
Whose worth's unknown, although his height be taken.
Love's not Time's fool, though rosy lips and cheeks
Within his bending sickle's compass come.
Love alters not with his brief hours and weeks,
But bears it out even to the edge of doom.
If this be error and upon me proved,
I never writ, nor no man ever loved.
-- William Shakespeare
What is the rhyme scheme of this poem?
A. ABBA CDDC EFFE GG
B. ABC ABC DEF DEF GG
C. AA BB CC DD EE FF GG
D. ABAB CDCD EFEF GG
Correct answer: D.
A Partial Illustrative RMCM_Answer to question 1:
A. Let me not to the marriage of true minds
  Admit impediments. Love is not love
  Which bends with the remover to remove
  Or alters when it alteration finds.
  O, no! It is an ever-fixed mark
  That looks on tempests and is never shaken.
  Whose worth's unknown, although his height be taken:
  It is the star to every wand'ring bark.
  Love's not Time's fool, though rosy lips and cheeks
  Within his bending sickle's compass come.
  Love bears it out even to the edge of doom -
  Love alters not with his brief hours and weeks.
  If this be error and upon me proved,
  I never writ, nor no man ever loved.
B. Let me not to the marriage of true minds
  Admit impediments. True love,
  Is an everfixed mark!
  Which alters not when it alteration finds
  Nor bends with the remover to remove.
  It is the star to every wand'ring bark,
  Whose worth's unknown, although his height be taken.
  Love's not Time's fool, though rosy lips and cheeks
  Within his bending sickle's compass come.
  Love looks on tempests and is never shaken.
  It alters not with brief hours and weeks,
  But bears it out even to the edge of doom.
  If this be error and upon me proved,
  I never writ, nor no man ever loved.
C. Let me not to the marriage of true minds
  Admit impediments. When it alteration finds -
  Which alters - that love is not love -
  Which bends with the remover to remove.
  O, no! It is an ever-fixed mark,
  Like the star to every wand'ring bark Whose worth's unknown, although his height be taken,
  It looks on tempests and is never shaken.
  Love alters not with his brief hours and weeks -
  It's not Time's fool, though rosy lips and cheeks
  Within his bending sickle's compass come -
  But bears it out even to the edge of doom.
  If this be error and upon me proved,
  I never writ, nor no man ever loved.
D. The original Sonnet 116 - no change
Question 2

What is the theme of Sonnet 116?
A. True love remains steady.
B. Even the strongest love is temporary.
C. Love changes as life changes.
D. Age and time alter love.
Correct answer: A.
RMCM_Answer (RMCM_Variants);
A. No change.
B. . . .
  Love is
  No ever-fixed mark
  That looks on tempests and is never shaken.
  . . .
C. . . .
  Love -
  It alters when it alteration finds
  Or bends with the remover to remove
  . . .
D. . . .
  Love's a Time's fool, the rosy lips and cheeks
  Within his bending sickle's compass come.
  Love alters with his brief hours and weeks,
  Ever changing to the edge of doom.
  . . .
Question 3

The following is the dictionary entry for the word relic:
relic (re lik) n. 1a. something that has survived decay or deterioration
b. a belief or custom remaining as a trace of an earlier culture or outmoded
practice 2. something cherished for its age or association with a person, place or event; keepsake [ME relik <OFr relique < Lat. Reliquiae, sacred relics < Lat. Remains < relinquere, to leave behind]
According to this entry, from which language did the word relic originate?
A. Middle English
B. English
C. Old French
D. Latin
Correct answer: D.
RMCM_Answer (RMCM_Variants):
A. . . .
  According to this entry, from which language did the word relic come to English?
B. . . .
  According to this entry, which language uses the modern form of the word relic?
C. . . .
  According to this entry, through which language did the word relic originally migrate from Latin?
D. (No change)
Question 4

The sophomore class plans to sell T-shirts with the school's name on them. The cost of each T-shirt alone is $3.50, and the printing cost of each shirt is $0.75. If the class plans on selling each printed T-shirt for $11, what expression can you use to calculate the class profit for selling n printed T-shirts?
A. 11.00 − (3.50 + 0.75)n
B. 11.00n − (3.50 + 0.75)
C. 11.00 − 3.50 − 0.75n
D. (11.00 − 3.50 − 0.75)n
Correct answer: D.
RMCM_Answer (RMCM_Variants):
A. The sophomore class plans to sell T-shirts with the school's name on them. The cost of each T-shirt alone is $3.50, and the printing cost of each shirt is $0.75. If the class plans on selling all of the printed T-shirts for $11, what expression can you use to calculate the class profit for selling n printed T-shirts?

-continued

B. The sophomore class plans to sell T-shirts with the school's name on them. The cost of T-shirts alone is $3.50, and the printing cost of T-shirts is $0.75. If the class plans on selling each printed T-shirt for $11, what expression can you use to calculate the class profit for selling n printed T-shirts?
C. The sophomore class plans to sell T-shirts with the school's name on them. The cost of all the T-shirts is $3.50, and the printing cost of each shirt is $0.75. If the class plans on selling all the printed T-shirts for $11, what expression can you use to calculate the class profit for selling n printed T-shirts?

Question 5.

Figure 3:
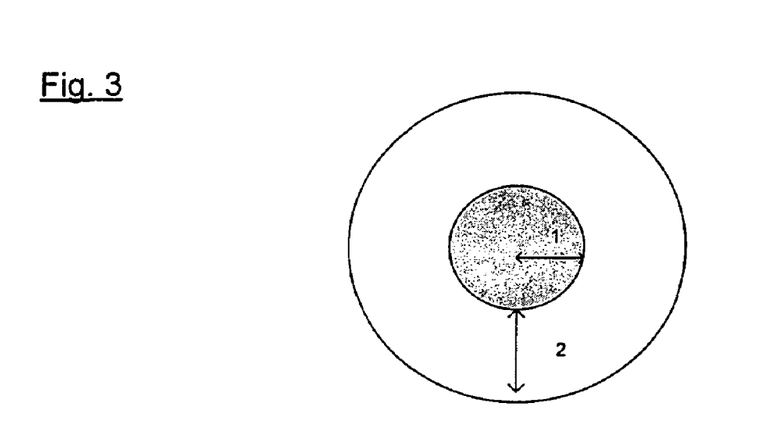
FIG. 3 is a drawing taken from a question on the 2001 MCAS Test.
Figure 4:
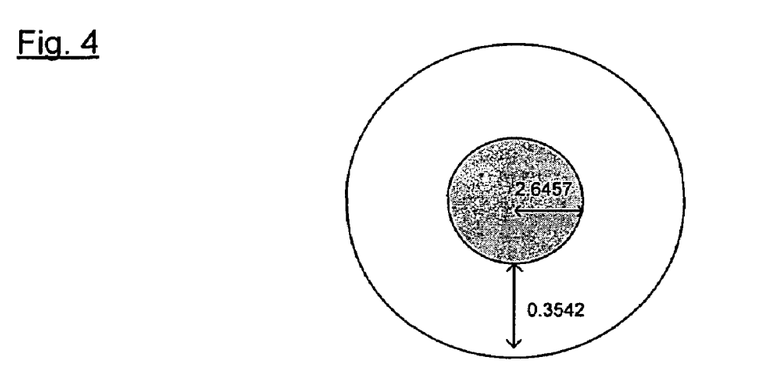
FIG. 4 is a modified drawing with reference to which an answer choice to the question referenced in FIG. 3 is a correct answer.
Figure 5:
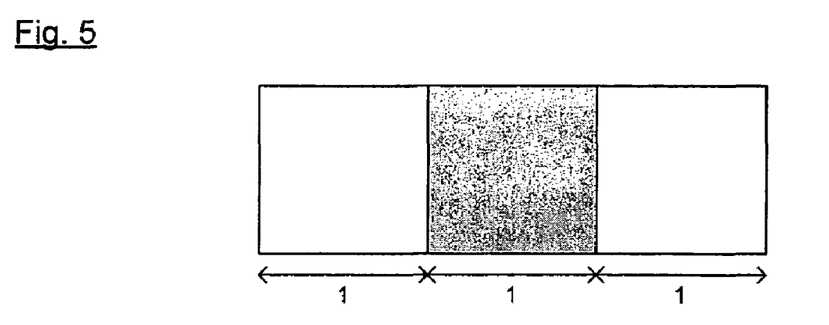
FIG. 5 is a modified drawing with reference to which another answer choice to the question referenced in FIG. 3 is a correct answer.

Julie designed a target computer game. On her computer screen, the circular targets look like the circular areas shown in FIG. 3.
If the computer randomly generates a dot that lands within the circular area, what is the approximate probability that the dot will land in the shaded area?
A. 1/9
B. 2/9
C. 1/3
D. 2/3
Correct answer: A.
RMCM_Answer (RMCM_Variants):
A. (No change)
B. . . . what is the approximate probability that the dot will land in the (shaded) white area?
C. First RMCM_Variant:
(Replace all instances of the word "circular" with "rectangular," and the figure as in FIG. 4.)
Second RMCM_Variant:
(Replace the numeral 2 in the figure shown by 0.732 or (the square root of 3) − 1.)
D. First RMCM_Variant:
(Replace the word "shaded" with "white", all instances of the word "circular" with "rectangular," and the figure as in FIG. 5.)
Second RMCM_Variant:
(Replace the word "shaded" with "white", and the numeral 2 in the figure shown by 0.732 or (the square root of 3) − 1.)

Having now described a few illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

I claim:

1. A method of generating educational materials, comprising the steps of:
    (a) providing one or more multiple-choice questions, each question comprising a query and a plurality of answer choices, wherein said plurality of answer choices comprises one correct answer and one or more incorrect answers; and
    (b) for at least one of said one or more incorrect answers, providing a follow-up query to which said incorrect answer is a correct answer;
    wherein at least one of step (a) or step (b) is carried out using a computer.

2. The method of claim 1, further comprising the step of:
    (c) compiling said multiple-choice questions and said follow-up queries in a medium suitable for educational purposes.

3. The method of claim 2, wherein said medium is a print medium.

4. The method of claim 2, wherein said medium is a computer-readable medium.

5. The method of claim 2, wherein said medium is an audiographic medium.

6. The method of claim 2, wherein said medium is a videographic medium.

7. The method of claim 1, wherein said at least one of said one or more incorrect answers is all of said incorrect answers.

8. The method of claim 1, wherein said follow-up query is a modification of said query.

9. The method of claim 8, wherein said modification comprises changing not more than fifty percent of the words of said query.

10. The method of claim 8, wherein said modification comprises changing one or more symbols in said query.

11. The method of claim 8, wherein said modification comprises changing one or more mathematical operators in said query.

12. The method of claim 8, wherein said modification comprises changing one or more mathematical values in said query.

13. The method of claim 8, wherein said modification comprises changing one or more fact objects in said query.

14. The method of claim 8, wherein said modification comprises changing a placement of at least one fact object within said query.

15. The method of claim 8, wherein said modification comprises a minimum number of changes of fact objects necessary such that said incorrect answer is a correct answer to said follow-up query.

16. A method of effecting educational interaction, comprising the steps of:
    (a) providing one or more multiple-choice questions, each question comprising a query and a plurality of answer choices, wherein said plurality of answer choices comprises one correct answer and one or more incorrect answers;
    (b) taking one or more of said plurality of answer choices;
    (c) identifying one or more fact objects in said query;
    (d) modifying said query by changing one or more of said one or more fact objects to produce a follow-up query;
    (e) determining whether said incorrect answer is a correct answer to said follow-up query; and
    (f) if said incorrect answer is not a correct answer to said follow-up query, repeating steps (d) and (e);
    wherein at least one of step (a), step (c) or step (d) is carried out using a computer.

17. A method of effecting educational interaction, comprising the steps of:
    (a) providing one or more multiple-choice questions, each question comprising a query and a plurality of answer choices, wherein said plurality of answer choices comprises one correct answer and one or more incorrect answers;
    (b) identifying one or more fact objects in said query;
    (c) selecting one or more of said plurality of answer choices;
    (d) modifying said query by changing one or more of said one or more fact objects to produce a follow-up query;
    (e) determining whether said incorrect answer is a correct answer to said follow-up query; and
    (f) if said incorrect answer is not a correct answer to said follow-up query, repeating steps (d) and (e);
    wherein at least one of step (a), step (b) or step (d) is carried out using a computer.

18. The method of claim 16, further comprising the step of:
    (f) compiling said multiple-choice questions and said follow-up queries in a medium suitable for educational purposes.

19. The method of claim 16, wherein said one or more fact objects are changed one at a time.

20. The method of claim 16, wherein, after each of said one or more fact objects have been changed one at a time at least once, said one or more fact objects are changed two at a time.

21. A method of study, comprising the steps of:
(a) receiving one or more multiple-choice questions from a computer-readable source, each question comprising a query and a plurality of answer choices, wherein said plurality of answer choices comprises one correct answer and one or more incorrect answers;
(b) reviewing said one or more multiple choice questions;
(c) choosing an answer choice to each of said one or more multiple-choice questions; and
(d) if said answer choice is an incorrect answer, generating a follow-up query to which said answer choice is a correct answer.

22. A method of study, comprising the steps of:
(a) receiving one or more multiple-choice questions from a computer-readable source, each question comprising a query and a plurality of answer choices, wherein said plurality of answer choices comprises one correct answer and one or more incorrect answers;
(b) reviewing said one or more multiple choice questions;
(c) choosing an answer choice to each of said one or more multiple-choice questions; and
(d) if said answer choice is an incorrect answer, reviewing a follow-up query to which said answer choice is a correct answer, and matching said follow-up query to said answer choice.

23. The method of claim 21, wherein said computer-readable source is a communications network.

24. The method of claim 23, wherein said communications network is the internet.

25. The method of claim 22, wherein said computer-readable source is a communications network.

26. The method of claim 25, wherein said communications network is the internet.

27. The method of claim 21, further comprising the steps of:
(e) choosing another answer choice; and
(f) if said another answer choice is an incorrect answer, generating a follow-up query to which said another answer choice is a correct answer.

28. A program stored on a computer-readable medium which, when executed, performs the steps of:
(a) providing one or more multiple-choice questions, each question comprising a query and a plurality of answer choices, wherein said plurality of answer choices comprises one correct answer and one or more incorrect answers; and
(b) for a selection of at least one of said one or more incorrect answers, providing a follow-up query to which said incorrect answer is a correct answer.

29. The program of claim 28, wherein said at least one of said one or more incorrect answers is all of said incorrect answers.

30. The program of claim 28, wherein one or more differences between said follow-up query and said query are distinguished.

31. The program of claim 28, wherein said query and said follow-up query are displayed simultaneously.

32. A method of teaching, comprising the steps of:
(a) providing one or more multiple-choice questions, each question comprising a query and a plurality of answer choices, wherein said plurality of answer choices comprises one correct answer and one or more incorrect answers;
(b) prompting a user to choose an answer choice to each of said one or more multiple-choice questions; and
(c) if said answer choice is an incorrect answer, prompting said user to identify one or more fact objects in said query which, when changed, will produce a follow-up query to which said answer choice is a correct answer;
wherein at least one of step (a), step (b) or step (c) is carried out using a computer.

33. A method of generating educational materials, comprising the steps of:
(a) providing one or more multiple-choice questions, each question comprising a query and a plurality of answer choices, wherein said plurality of answer choices comprises one correct answer and one or more incorrect answers;
(b) identifying one or more fact objects in said query; and
(c) modifying said query by changing one or more of said one or more fact objects to produce a follow-up query to which said answer is a correct answer;
wherein at least one of step (a), step (b) or step (c) is carried out using a computer.

34. The method of claim 33, further comprising the step of:
(d) repeating step (c) to produce another follow-up query to which said answer is a correct answer.

35. A method of generating educational materials, comprising the steps of:
(a) providing one or more multiple-choice questions, each question comprising a first part and a second part, said second part comprising a plurality of answer choices and said first part comprising a remainder of said question excluding said second part, wherein said plurality of answer choices comprises one correct answer and one or more incorrect answers;
(b) identifying one or more fact objects in said first part; and
(c) modifying said first part by changing one or more of said one or more fact objects to produce a follow-up first part to which said answer is a correct answer;
wherein at least one of step (a), step (b) or step (c) is carried out using a computer.

36. A method of generating educational materials, comprising the steps of:
(a) providing one or more multiple-choice questions, each question comprising a query and a plurality of answer choices, wherein said plurality of answer choices comprises one correct answer and one or more incorrect answers;
(b) identifying one or more fact objects in said query;
(c) initializing a counting variable at a value of 1;
(d) modifying said query, by changing a number of fact objects equal to the value of said counting variable, to produce a follow-up query;
(e) if said incorrect answer is not a correct answer to said follow-up query, and if not all possible combinations of a number of fact objects equal to said counting variable have been changed to produce follow-up queries, repeating steps (d) and (e)
(f) if said incorrect answer is not a correct answer to said follow-up query, incrementing said counting variable by adding 1 thereto, and repeating steps (d), (e) and (f);

wherein at least one of step (a), step (d) or step (e) is carried out using a computer.

37. A method of monitoring a student's progress, comprising the steps of:
(a) providing one or more multiple-choice questions, each question comprising a query and a plurality of answer choices, wherein said plurality of answer choices comprises one correct answer and one or more incorrect answers;
(b) prompting said student to select an answer choice to one or more of said questions;
(c) if a selected answer choice is an incorrect answer, prompting said student to identify one or more fact objects in said query which, when changed, will produce a follow-up query to which said selected answer choice is a correct answer;
(d) maintaining a record of said selected answer choice; and
(e) evaluating said record against a preset standard;
wherein at least one of step (a), step (d) or step (e) is carried out using a computer.

38. The method of claim 37, wherein the method is carried out as a distance learning application over a communications network.

* * * * *